United States Patent [19]
Zhang

[11] Patent Number: 5,590,116
[45] Date of Patent: Dec. 31, 1996

[54] MULTIPORT ANALYZING, TIME STAMP SYNCHRONIZING AND PARALLEL COMMUNICATING

[75] Inventor: Jing Zhang, Durham, N.C.

[73] Assignee: Wandel & Goltermann Technologies, Inc., Research Triangle Park, N.C.

[21] Appl. No.: 385,288

[22] Filed: Feb. 9, 1995

[51] Int. Cl.$^6$ ................................................. H04J 1/16
[52] U.S. Cl. ................................ 370/253; 370/252
[58] Field of Search ..................... 370/94.1, 94.2, 370/60, 60.1, 13, 17, 94.3, 85.1, 85.5, 85.13, 103; 371/20.5, 29.1, 20.1; 395/325, 200, 917; 340/825.05, 825.02, 825.03; 364/15.11; 358/406; 379/23; 375/224, 225, 282, 357; 305/280, 285, 200.01

[56] References Cited

U.S. PATENT DOCUMENTS

| | | | |
|---|---|---|---|
| 4,276,656 | 6/1981 | Petsyk, Jr. | 375/282 |
| 4,792,753 | 12/1988 | Iwai | 37/13 |
| 4,916,694 | 4/1990 | Roth | 370/94.1 |
| 4,998,240 | 3/1991 | Williams | 370/17 |
| 5,097,469 | 3/1992 | Douglas | 371/20.1 |
| 5,197,127 | 3/1993 | Waclawsky et al. | 395/200 |
| 5,247,517 | 9/1993 | Ross et al. | 370/85.5 |
| 5,260,970 | 11/1993 | Henry et al. | 375/224 |
| 5,276,529 | 1/1994 | Williams | 358/406 |
| 5,282,194 | 1/1994 | Harley, Jr. et al. | 370/17 |
| 5,347,524 | 9/1994 | I'Anson et al. | 371/29.1 |
| 5,363,493 | 11/1994 | Unverrich | 395/325 |
| 5,375,159 | 12/1994 | Williams | 379/23 |

*Primary Examiner*—Douglas W. Olms
*Assistant Examiner*—Dang Ton
*Attorney, Agent, or Firm*—Moore & Van Allen PLLC; William G. Dosse

[57] ABSTRACT

A plurality of digital transmission network analyzers are arranged to analyze and compare the appearance of a data packet on the plurality of ports of a network. Each analyzer has its own internal clock for time stamping of data packets in addition to other internal timing purposes. In order to synchronize the time stamping of the packet as it appears to each analyzer at a each different port, the clock outputs of the several analyzers are connected together; and a controlling CPU commands one of the analyzers to supply the master clock to the others. That master analyzer then commands the other analyzers to disable or disconnect their own clocks, thereby all of the analyzers involved in a given test are under timing control of the clock of the master analyzer. Packet headers and time stamps are transmitted between analyzers for comparison, analysis, and reporting to the controlling CPU. This analyzer intercommunication is done over a separate bus that interconnects all of the analyzers and the controlling CPU.

11 Claims, 2 Drawing Sheets

MULTIPORT ANALYZING, TIME STAMP SYNCHRONIZING AND PARALLEL COMMUNICATING

TECHNICAL FIELD

The present invention relates to network analyzers and more importantly to network analyzers that analyze in real time the data packets as they progress or flow from port to port through a network.

BACKGROUND ART OF THE INVENTION

Analyzers for digital transmission networks such as local area networks (LANs) and wide area networks (WANs) are well known. Networks have many different formats or protocols in which they convey digital data. The digital data are usually transmitted in packets or frames which are usually of varying length, depending upon the number of bits in the data portion of the packet. When the protocol dictates that the packets be of uniform length, the packet is usually called a "cell."

Packets usually have headers (e.g., addresses) and footers on the two ends of the packet, with the conveyed data bits being in the middle. The nature and content of the headers and footers is usually dictated by the protocol of the type of network. Network analyzers are expected to monitor the digital traffic or bit stream so as to identify and examine principally the headers and footers of each packet in order to analyze the digital health of the system. Hence, they are often called network protocol analyzers. There are many examples of network protocol analyzers, an exemplary one is shown in U.S. Pat. No. 4,792,753 granted to Iwai on Dec. 20, 1988.

Any place giving access to the network is called a "port." In order to analyze what is happening to the bit stream between any two ports, an analyzer must be connected to each port. A test packet might be injected at one port and analyzed as it passes the other port. However, there are situations—as when a test packet might not be sufficiently representative of normal traffic—in which using a test packet is not desirable. In that case, it may be best to analyze a normal, data-containing packet.

In order to analyze the propagation of a random packet propagating between two ports of the network, The packet is time stamped as it passes the first port and its header stored. The time stamp is not added to the packet and continued on the network. The time stamp is stored at the analyzer along with the header. When that packet passes the second port, it is again time stamped; and the two time stamps are compared to determine how long it took that packet to propagate from the first port to the second port. That propagation might have involved passing through one or more digital switches or some other network components with propagation times that have no relationship to the speed of light.

There must be some way for the time stamp information—and perhaps the header—to be transmitted from one analyzer to either another analyzer for comparison or from two or more analyzers to another computer for comparison. This can be done perhaps on the network under test or perhaps off the network under test. Flexibility of operation is very important. Therefore, analyzers usually have considerable software control of their many analysis functions. Such software control is exercised with a main central processing unit (CPU), which is usually a microprocessor contained within the network transmission analyzer, itself. A network analyzer may also have separate computer, such as a "laptop," controller to facilitate human interface and to "program" each analysis situation into the analyzer.

Also, the two analyzers must have their clocks synchronized both as to a base count coordination and to clocking together at the same rate, or the difference between the two time stamps might reflect clock discrepancy more than packet propagation time.

One way of clock synchronization and counter coordination is to put two analyzers in the same cabinet with the controller computer and use the controller computer's clock to run both analyzers and also to synchronize the counts used by both analyzers. This is the technique used in the DA-30 network analyzer manufactured by Wandel & Goitermann Technologies, Inc, of Research Triangle Park, N.C. However, it is sometimes necessary to analyze the propagation of packets as they pass more than two ports on the network or when the ports are physically far enough apart so that connecting to two ports of the network to the same cabinet becomes inconvenient.

Another way of clock synchronization is to connect each analyzer to a satellite radio receiver to receive time signals from the Global Positioning System satellites. Such an option is available from Wandel & Goitermann Technologies, Inc., for use with their DA-30 analyzer. However, such synchronization may not be sufficiently accurate for smaller networks for which the satellite time differences may be a substantial percentage of the expected propagation time through the network.

SUMMARY OF THE INVENTION

The purpose of the present invention is to analyze data packets in a digital communication network as the packets pass a plurality of ports of the network.

Accordingly, an object of the present invention is an analyzer having data packet analyzing capability, for connecting to one of the ports of a digital transmission network with multiple ports and having a clock connectible with the clock of at least one other analyzer connected to another port of the network. A control circuit in the analyzer selectively disables the clock in order to allow the clock of another analyzer to control. A receive-transmit circuit in the analyzer intercommunicates with at least one other analyzer connected to another port of the network under control of a control circuit which controls the interconnection configuration of the receive-transmit circuit in response to a received command.

Another object of the present invention is to facilitate, at an analyzer for digital transmission networks, intercommunication between analyzers, including at least one receive-transmit circuit in an analyzer for intercommunicating with another analyzer separately from said digital transmission network, with a receive-transmit control circuit for controlling the transmission and reception capability of the receive-transmit circuit in response to a command.

Still another object of the invention is a facility for analyzing multiple ports of digital transmission networks, which includes a plurality of individual network analyzers, each having a local oscillator clock, the output of which is interconnectible with the output of the clock in each of the other analyzers and a clock control circuit in each analyzer for sending to the other network analyzers a clock disable signal in response to a command from an analysis-control computer which controls and programs the individual analyzers to perform an analysis, and each analyzer having a receive-transmit circuit for intercommunicating in either direction with the other analyzers in response to a receive-transmit control circuit, under command from the CPU.

BRIEF DESCRIPTION OF THE DRAWINGS

The present invention will be more fully understood by reference to the following detailed description when considered in conjunction with the following drawings wherein like reference numbers denote the same or similar parts shown throughout the several FIGURES in which.

BEST MODE FOR CARRYING OUT THE INVENTION AND ITS INDUSTRIAL APPLICABILITY

Figure 1:
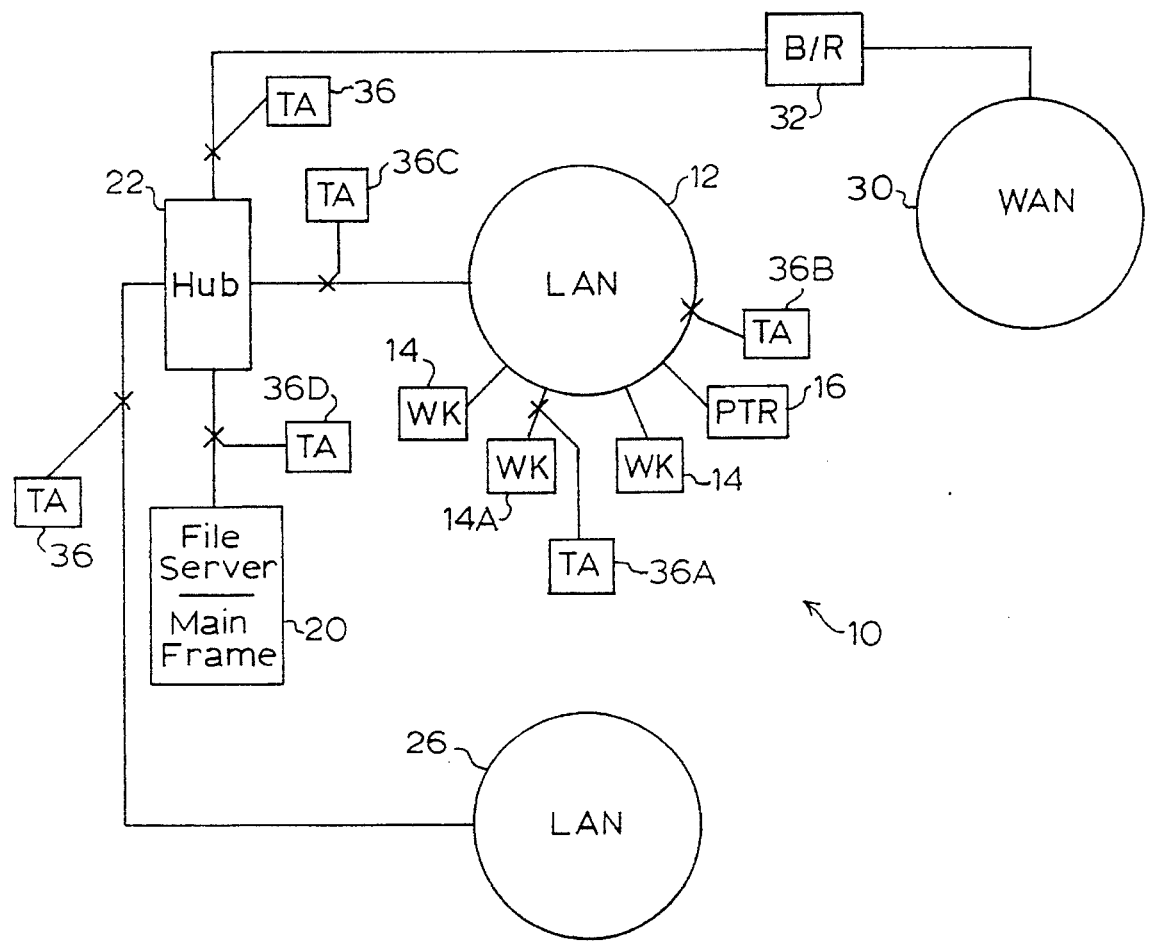
FIG. 1 is a schematic diagram of a digital transmission network system illustrating where multiple transmission analyzers might be placed within the network system.

Referring now to the accompanying drawings and more particularly to FIG. 1, there is shown a digital transmission network system 10 which includes at least one local area network (LAN) 12. The LAN 12 is a digital transmission network which transmits digital data in packets at up to about 56 megabits per second, in a coaxial cable system, between a plurality of workstations 14, only a few of which are shown in FIG. 1, and between the workstations and other devices.

There might also be one or more printers such as the printer 16 conventionally connected to the LAN 12. The main purpose of the LAN might be to connect the several workstations 14 with the printer(s) 16 and also with a conventional file server computer 20 which may be a mainframe and which may even be accessible to the LAN 12 through a hub 22. The hub 22 is conventional and functions to interconnect and perhaps switch data packets between the LAN 12 and another LAN 26 and a wide area network 30, through a conventional bridge/router 32.

In order to analyze the performance of such a digital transmission network system, transmission analyzers (TAs) 36 might be strategically placed about the network system. Except for the features described herein, these TAs 36 can be conventional, see U.S. Pat. No. 4,792,753 (mentioned above). Each TA 36 is capable of functioning independently under the control of a computer (a CPU, either internal to the TA or a separate PC, such as a "lap top"). The PC can include the TA's human interface (such as a keyboard and a video screen).

In FIG. 1, the several TAs 36 might be arranged as shown to analyze packets going between a workstation 14A and the file server 20 or beyond.

A transmission analyzer (TA) monitors digital transmission, which may be flowing in a coaxial cable that loops through a portion of a building. The coaxial cable might be connecting through a modem to each one of a large number workstations 14, printers 16 and through the hub 22, to the file server 20, which might serve only the workstations 14 on the LAN 12 or might serve all of the workstations on all of the LANs and WANs on the system 10.

As a packet flows from the workstation 14A, it is first captured (read, filtered, and perhaps partially stored) by a transmission analyzer (TA) 36A. The packet does not stop at the TA 36A but continues to its destination, without delay or alteration. However, the TA 36A stores at least a portion of the packet's header, perhaps with an address and some other packet identification. In the field of network protocol analyzers, the term "filter" means to examine a byte or groups of bytes, looking for a particular sequence of bits. When that sequence is found, some action is triggered. For example, if the TA is filtering the address portion of the header, it looks for a particular address in that header and then triggers a time stamp, storage, and conventional analysis operation.

The TA also time stamps the packet. The time stamp is important since it identifies when the packet left the workstation 14A. The time stamp is just a number which represents the output of a clock in the TA 36A. The time stamp is not added to the packet on the LAN but is stored with the portion of the packet header in the TA's memory.

As the packet progresses about the LAN 12, it passes another TA 36B which again stores the same portion of the packet header and time stamps it. The packets do not necessarily travel at the speed of light around the LAN. They are frequently read and sometimes switched. Most of these functions introduce delay into the transmission. One of the most useful functions of multiple, simultaneous packet analysis is to analyze those delays. When the packet reaches the hub 22, its header is again captured, time stamped and stored by a TA 36C.

The hub 22 might be a digital switch which stores the whole packet or only the header long enough to read it. After the packet address has been read, the hub 22 preferably sends it on to the file server 20, after delaying it only by the time needed to read and interpret the address.

As the packet leaves the hub 22, en route to the file server 20, it is captured by TA 36D, which filters the packet to identify it as a packet desired for testing, captures the header address, etc., time stamps it, and stores the result. In this way, the TAs have time stamps for the same packet as it leaves the workstation 14A, as it enters the file server 20 and at several intermediate points. However, it is necessary to ascertain that these time stamps are valid and it is necessary to communicate the stored information for analysis.

When Analyzing the operation of a LAN, it is of little use to time stamp the same data packet at several points if the time stamps are not synchronized. Therefore, it is important that the time stamp counters of the several TAs are in synchronism, that is, they are all at the same count at the same time. Also, it is important promptly to communicate the header and time stamp information to whatever TA will analyze the data; because, there is probably another packet coming down the LAN almost immediately.

In order to analyze the propagation time or the speed of the data transmission from the LAN port to which the TA 36A is connected to the LAN port to which TA 36B is connected, the header information and time stamp captured and stored at TA 36A is preferably sent promptly to TA 36B. At TA 36B, the conventional TA circuitry is used under customary program control to filter and thus recognize the identity of the header information received from TA 36A and the header of the packet that is being or was just received by TA 36B. Also, TA 36B then calculates a propagation time under program control by comparing the two time stamps. Each TA typically has one or more main central processing unit (CPU), preferably one or more microprocessors, such as a reduced instruction set computer (RISC) integrated circuit (IC) chip, and stored-program control to perform the analyses of which the TA is capable.

Figure 2:
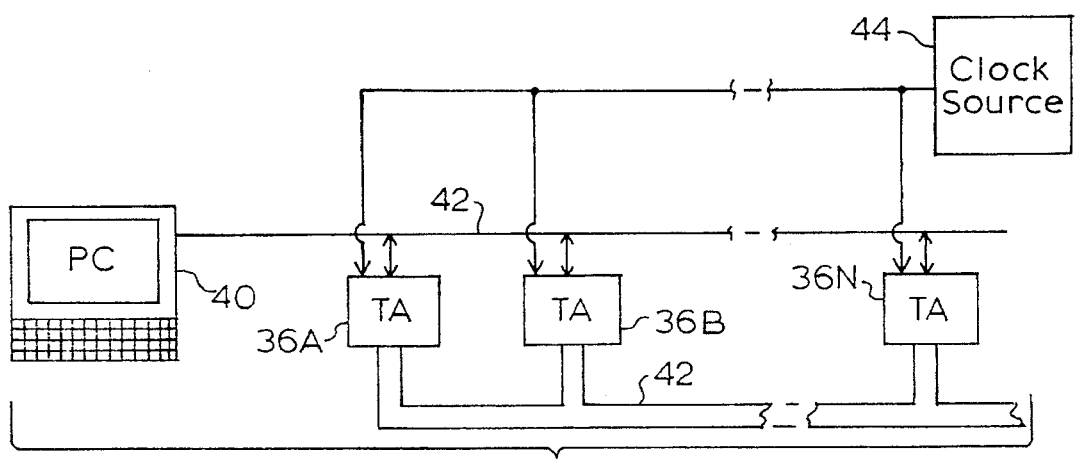
FIG. 2 is a schematic diagram of the interconnection logic of a plurality of transmission analyzers operating together at multiple ports of a digital transmission system, under the control of a PC, functioning as the human interface of the exemplary analysis system.

Referring now to FIG. 2, there is shown a schematic diagram of generally how the TAs 36 communicate and how they are interconnected. A laptop PC 40 is the human interface for and is the analysis-control computer for a plurality of TAs 36A, 36B, . . . 36N. Theoretically, there could be an indeterminate number of TAs used simultaneously to analyze a LAN; but currently, as an economic matter, there would seldom be a need for more than about seven or eight of them. The PC 40 is connected to a bus 42 that extends to all of the TAs involved in a test.

The control computer or PC 40 typically stores information as to what tests are to be performed and which TAs will do what and how they are to do it, in accordance with practices well established in the field of network protocol analysis. These stored testing program instructions are then selectively transferred to the TA in response to commands from the human technician who is planning and directing the test. Another part of that bus 42 interconnects the TAs completely separate from any connection with the control computer or PC 40.

A network clock source 44 is shown in FIG. 2. The operation of this bit clock in connection with an alternative embodiment of the present invention is described in greater detail below.

As an example of the cooperative analysis possible with a plurality of analyzers 36, when the TA 36B has calculated the propagation time of a packet from the workstation 14A to the port to which TA 36B is connected, TA 36B reports this result over the bus 42 to the PC 40. Alternatively, the TA 36B can be programmed to send the results on to the TA 36C, along with the header and TA 36B's own time stamp. As another alternative, TA 36B could have been programmed to ignore the traffic from TA 36A and simply to report its header and time stamp to TA 36D which would then be programmed to accumulate the headers and time stamps from all four TAs, calculate all of the propagation times and report all of the results to the PC 40 over the bus 42.

Flexibility in the arrangement and usage of the TAs is very important. Therefore, the bus 42 is preferably completely separate from the LAN 12 and preferably comprises several multiconductor computer cables that extend between type HD-50 parallel ports on each TA—there are preferably two, each—and a compatible port on the PC 40, making a daisy-chain parallel connection.

It is usually preferable that communication to, from, and between the TAs be conducted in a path parallel to and separate from the network that is under test. However, TA communication can also be on the network under analysis, as long as such communication would not adversely affect the test and the test results. It is even possible for the TAs and/or the PC 40 to dial-up a telephone connection between each other, using modems, to intercommunicate via the telephone line.

It is commercially desirable that each TA 36 be as flexible and general-purpose as possible, in order to allow its use in any reasonable configuration of network protocol analysis. Therefore, in addition to its conventional transmission-analyzing circuitry and program control, each TA 36 preferably includes the circuits represented schematically in FIG. 3, which shows a single TA 36 connected to some of the conductors of the bus 42. Included within the TA 36 is an oscillator or clock 50, the output of which serves the time stamping and other internal circuitry of the TA 36.

The output of the oscillator or clock 50 is delivered to a buffer gate 52C of four buffer gates 52. A buffer gate circuit has a three-state output: floating when the voltage input at the gate terminal is logically high, just like an open switch; and high or low to follow the voltage at the input of the buffer gate, when the voltage input at the gate terminal is logically low.

The four buffer gates 52 have their controlling or gate terminals connected in common and connected to the "inverted" output 53 of a control flip-flop 54 having a reset input 56. A set input 58 of the control flip-flop 54 is connected to the output of an AND-gate 60. One input of the AND-gate 60 is connected to the output of a generalized communication and decoding/coding circuit 62 (described more fully below). The other input of the AND-gate 60 is connected to the output of a buffer gate 52A of the four buffer gates 52 and to one terminal of a 10,000-ohm resistor 64, the other end of which is connected to a logical high reference voltage. The input of the buffer gate 52A is connected to ground, a logical "low" reference voltage.

Figure 3:
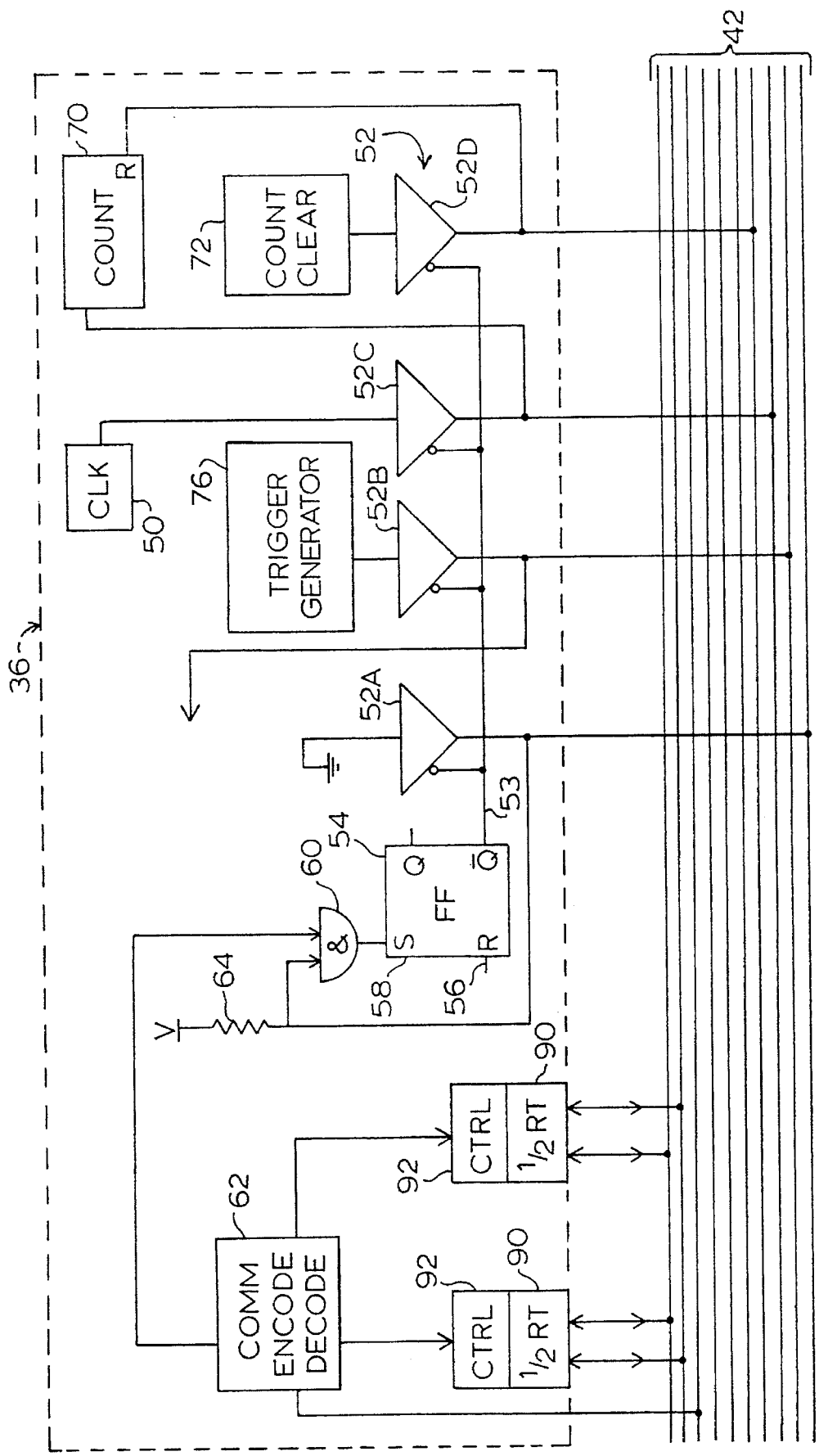
FIG. 3 is a schematic diagram of how several parts of an otherwise conventional transmission analyzer might be connected to an intercommunication bus between the analyzers but separate from the digital transmission network under test.

When the TA 36, shown in FIG. 3, is "powered up," the conventional power-up circuit of the TA 36 sends a clear or reset signal to many of the TA's internal circuits, including the reset input 56 of the control flip-flop 54. Therefore, when the TA has first been powered up, the flip-flop 54 is initially in its "reset" condition. In this reset condition, the "normal" output of the control flip-flop 54 is at a logically "low" voltage. The "inverted" output 53 of the control flip-flop 54 is then at a logically "high" voltage. Therefore, since the gate terminals of the four buffer gates 52 are at a high voltage, their output terminals are in their floating state.

If the PC 40 then sends a command signal over the bus 42 to the TA 36 shown in FIG. 3, commanding the TA to assume the role of "master" for a test, the decoding/encoding communication circuit 62 receives that command and sends a set signal to the AND-gate 60. That set signal is a transition from a low reference voltage to a high reference voltage, applied to one input of the AND-gate 60, the other of which is at a high reference voltage by reason of the floating output of the buffer gate 52A and the resistor 64 connected to a high reference voltage. Since both of the inputs of the AND-gate 60 are at a high voltage, the output of the AND-gate 60 sends a high reference voltage signal to the set input of the flip-flop 54, changing it from its reset condition or state to its set condition.

When the flip-flop 54 is in its set condition, its inverted output 53 sends a low reference voltage to the gate terminals of the buffer gates 52, changing them from their "floating" or "open-switch" output condition to their "closed" or "closed-switch" condition in which their output voltages duplicate or follow their input voltages.

When the buffer gate 52A is in its closed condition, the ground or low reference voltage at its input is also present at its output and is thus presented to one input of the AND-gate 60, blocking any further set signals from passing to the set input 58 of the flip-flop 54. Blocking further set signals to the flip-flop 54 may not be significant once the flip-flop has been put into its set condition. However, that ground voltage at the output terminal of the buffer gate 52A is also connected to and carried on one of the conductors of the bus 42.

All of the TAs participating in the test (see FIG. 2) have the outputs of their buffer gates 52A connected to that same conductor of the bus 42. Therefore, all of those other AND-gates 60 of those other TAs are also thus prevented from passing set signals to the set inputs of their flip-flops 54 and from closing their buffer gates 52. In this way, the TA 36 that receives the first set signal to its AND-gate 60 thus sends a ground voltage disconnect or clock-disable command to the other TAs of the test and becomes the "master" TA for the test. Therefore, the designated "master" TA has thus seized control of selected (as described below) local functions, within each TA 36, for the duration of the test.

The generalized communication circuit 62 is very flexible. It can preferably be the program-controlled microprocessor which operates the rest of the functions of the TA 36. Alternatively, it can be a stand-alone circuit which contains nothing more than a filter or prefix-byte recognition circuit, to recognize a prefix byte from the PC 40 and which enables the next or command byte to address a look-up table in a read-only memory ROM which translates that next byte to a binary code which is recognized by gates such as AND-gates (not shown) to send voltage signals on single conductors to functional circuits such as the AND-gate 60 and flip-flop 54.

Referring now to the clock 50 and the buffer gate 52C when the flip-flop 54 closes the four buffer gates 52, the buffer gate 52C connects the output of the clock to the input of a time-stamp counter 70. Therefore, the count of the counter 70 is controlled by the clock 50 of its own TA 30. The contents of the counter 70 are recorded in the conventional memory circuits of the TA, along with received packet headers in order to "time stamp" each associated transmission packet. Each time stamp count is a representation of the time that the associated packet arrived at that TA 36.

If each TA 36 used its own internal clock for time stamping, the test results could be flawed; because, internal clocks, although highly-accurate crystal oscillators, can never be 100% perfectly synchronized. Therefore, the object is to use only the clock 50 of the "master" TA 36 to advance the counters of all of the TAs participating in the test, thus per force synchronizing them.

The "master" TA 36 has its buffer gate 52C closed, connecting its clock 50 with its own counter. Meanwhile, the output of the clock 50 is also connected, via the output of the buffer gate 52C, to another conductor on the bus 42. All of the other TAs that are participating in the test also have the outputs of their buffer gates 52C connected to that same conductor of the bus 42 and thus to the inputs of their time-stamp counters 70. The ground voltage placed on the bus conductor connected to the "master" TA's buffer gate 52A is also present at the output of the buffer gate 52A of all of the other TAs participating in the test. Therefore, the flip-flops 54 of all of those other TAs can not close their associated buffer gates 52; and the buffer gates 52C of all of those other TAs that have failed to become a "master" are now in their "open-switch" condition. Consequently, the clocks 50 of those other TAs are disconnected from their counters 70. This allows the clock 50 of the "master" TA 36 to pass through its own now-closed buffer gate 52C and advance all of the counters 70. Therefore, all of the counters 70 in the test advance their time-indicating counts in synchronism.

Alternatively, the control computer or PC 40 could address and send clock-disconnect signals directly to the reset inputs of the flip-flops 54 of the other TAs, obviating connecting the output of the buffer gate 52A to a conductor of the bus 42. As another, and less attractive alternative, the "master" TA could address and send a more complex clock-command to the communication circuit 62 of one of the other TAs with instruction that that other TA address and "pass along" down the line the clock-disconnect signal to the rest of the TAs but not to the address of the "master" TA.

While it is important that all of the counters 70 of the TAs advance their counts together, it is equally important that all of the counters 70 start their counts somehow coordinated or perhaps even started together. Within each TA 36, there is an existing, conventional test-start command function (represented by a block 72), preferably performed by the main CPU of the TA 36, under local program control, that generates an internal start-test signal. However, such a function could be performed by a hard-wired circuit, or perhaps even some combination of hard wiring and program control.

In connection with the present testing arrangement, this generalized test-start signal generating function is used as a counter clear command 72. The output of the counter clear command 72 passes through a closed buffer gate 52D in the "master" TA 36 that has seized control at the start of a test and resets its own time-stamp counter 70. Such a start-of-test and thus clock-reset coordination command preferably is done under command and control of the PC 40. Therefore, the PC 40 ultimately causes the counter of each TA 36 to be reset simultaneously prior to the start of a test, that is prior to time stamping and recording a packet header.

In addition to being connected to the reset input of its own time-stamp counter 70, the output of the buffer gate 52D is connected to still another of the conductors of the bus 42 to the input terminals of the buffer gates 52D of all of the other TAs participating in the test. Therefore, since the buffer gate 52D, like the buffer gates 52A and 52C of the other TAs are in the open-switch condition, the counter reset command from the "master" TA 36 is also presented to the reset inputs of the counters 70 in all of the TAs participating in the test. Therefore, since the same counter reset signal is presented to the reset inputs of all of the time-stamp counters 70 simultaneously, the counters all perform the test in synchronism.

Referring now to FIG. 2, an alternative system is shown for synchronizing the time-stamp counters 70 of the several TAs. In order to achieve count synchronism (starting at the same time, at the same reset count) among the time-stamp counters 70 of the several TAs participating in a test, the PC 40 sends a counter-reset command preferably sent on the bus 42 to each TA 36. That counter-reset command can be the same as a test-start command.

In order to advance the time-stamp counters 70 in synchronism, a separate clock, not connected with either the PC 40 or any of the TAs is used. The preferred separate clock is the Stratum Clock or a Bits Clock (represented in FIG. 2 by the clock source 44) that is used by the Regional Bell Operating Companies (RBOCs) and others to time the bits constituting the traffic in networks. The Stratum Clock is distributed by the RBOCs over most of the United States. Within a single RBOC, a Bits Clock is also available (usually at 64 k baud for digital data services) and is synchronized to the Stratum Clock. Where such a clock is available, it can be utilized advantageously to advance in synchronism the time-stamp counters 70 in the several TAs that are conducting a test at several ports of the network.

As described in connection with FIG. 3, each TA 36 has an internal counter 70 that is used to provide the time stamps for data packets as they pass the port which the TA is monitoring. In the present alternative embodiment, using a separate, external clock source 44, the internal clocks 50 of the TAs are not used to advance the time-stamp counters 70. Instead, the clock inputs to the internal time-stamp counters 70 receive bit clock signals at the bit rate from the RBOC's Stratum Clock or Bits Clock represented by the clock source 44. It is understood that this Stratum Clock or Bits Clock is available at every RBOC location where data network traffic is handled or controlled.

This Stratum Clock or Bits Clock can be utilized at the clock source 44, to which the TA 36 is connected and is not at all related to the PC 40, or necessarily the network under test. While individual data packets may be delayed momentarily at various ports throughout the network—and ascertaining those delays is one of the exemplary uses of the present invention—all of the data traffic flowing in a WAN in the RBOC-controlled portions of the network will move at a bit rate or baud determined by the RBOC's system Stratum Clock or Bits Clock. Therefore, that Stratum Clock of Bits Clock will be present or can be derived anywhere that such a WAN bit stream is present. Consequently, as suggested by the connection of the clock source 44 to the clock input to the time-stamp counter 70 of each TA 36, the counting of each counter 70 is thus advanced in synchronism with the other counters 70 at the bit rate dictated by the external RBOC Stratum Clock or Bits Clock.

Referring again to FIG. 3, the main CPU of each TA 36 conventionally generates several trigger signals for use variously throughout the TA. However, when several TAs are participating in a single test at multiple ports of a Network, it may be necessary to communicate a trigger signal from the "master" TA 36 to the other TAs participating in the test. The trigger generator 76 represents whatever aspect of the main CPU of the "master" TA 36 that generates the trigger signal that must be sent to the other TAs participating in the test.

The output of the trigger generator 76 passes through a closed buffer gate 52B in the "master" TA 36 that has seized control at the start of a test. The output of the trigger generator 76 is thus connected through the closed buffer gate 52B to whatever function of the "master" TA 36 would normally receive that same trigger signal.

In addition to being connected to whatever function of its own that requires that trigger, the output of the buffer gate 52B is connected to still another of the conductors of the bus 42 to the input terminals of the buffer gates 52B of all of the other TAs participating in the test. Therefore, since the buffer gate 52B, like the buffer gates 52A, 52C, and 52D of the other TAs are in the open-switch condition, the trigger signal from the "master" TA 36 is also presented to the corresponding functions needing that trigger in all of the other TAs participating in the test.

If the TA 36 depicted in FIG. 3 had not been designated as the "master," some other participating TA would be designated as the "master" for the test. The undesignated TA 36 would have its buffer gate 52B in open-switch condition, and the master would then provide the needed trigger for the internal function of the undesignated TA. That trigger would come from the closed-switch buffer gate 52B of the designated TA 36, through the associated conductor of the bus 42, to the output terminal of the buffer gate 52B of the undesignated TA. From there, it would go to whatever function of the undesignated TA is in need of that trigger.

In the performance of transmission analysis at multiple port locations on a network, it is desirable to compare test data gathered by the several TAs at the several network ports while each TA monitors passage of the same data packet. The data thus gathered at the several network ports is then compared for analysis. This may involve transmitting selected information such as packet header(s) and packet time stamps at each of the TAs. Since each TA 36 has been designed and built for performing just such analyses, it is preferable to have one of the TAs do the necessary computation and other analysis. However, as an alternative, the PC 40 could be programmed to do such work. Therefore, it is preferred that header and time stamp information be communicated from the TA 36 that senses a given packet earliest to transmit the header and time stamp of that packet to a TA 36 that senses the same packet later. That second TA 36 can do the calculation and analysis and inform the PC 40 of the results.

In order to transmit header and time stamp information between the several TAs involved in a test, each TA 36 is preferably equipped with two half-duplex receive/transmit (R/T) circuits 90. Each R/T circuit has two input/output (I/O) connections to the bus 42. Each I/O connection is to a different group of parallel data conductors within the bus. Therefore, each R/T circuit 90 can send or receive on either or both of the groups of parallel data conductors. However, being preferably half duplex, an R/T circuit 90 can not send and receive at the same time.

Each R/T circuit 90 is controlled by an R/T control circuit 92 which receives and executes control signals from the PC 40 over preferably another multi-conductor portion of the bus 42, intended for parallel or simultaneous transmission of addressed and coded bytes of command and control information or signals. The control signals from the PC 40 are only heeded by the addressee TA 36 and are ignored by the others by the addresses contained in the signal information that is addressed and sent to the communication circuit 62 of the several TAs.

Each R/T control circuit 92 controls its associated R/T circuit 90 to either send or receive and to do that sending or receiving on either one or the other or both of the groups of parallel data conductors of the bus 42.

The purpose of the R/T circuits 90 is to interconnect all of the TAs participating in the test for intercommunication of such information as headers and time stamps, as also described above in connection with FIG. 1. That intercommunication can be with the PC 40 as well as between the several TAs participating in the test. With the amount of flexibility afforded by using two R/T circuits 90, each able to selectively use either of two communication paths in the bus 42, great flexibility can be achieved under program control from the PC 40. For example, referring to FIG. 1, the PC 40 can command all of the TAs to have one R/T 90 transmit on one group of data conductors in the bus 42 while the other R/T receives on the other group. This gives each TA the option of addressing a message to any of the other TAs in the test, as well as the PC 40. Other, less flexible arrangements are easily possible.

Alternatively, the communications circuit 62 can be the vehicle for intercommunication between the several TAs as well as with the PC 40, rather than using flexibility of the R/Ts 90. As another alternative, all communication among the TAs and between the TAs and the PC 40, other than critical timing-related functions can be sent on the network transmission path between packets.

The conception and the specific embodiments disclosed above may be readily utilized as a basis for modifying or designing other structures for carrying out the purposes of the present invention. Such equivalent constructions do not depart from the spirit and scope of the invention, as set forth in the appended claims.

I claim:

1. An analyzer for digital transmission networks with multiple ports, said analyzer having data packet analyzing capability, a facility for participating in an analysis with at least one other analyzer with which said analyzer is synchronized and in intercommunication outside of the digital transmission networks under the analysis, for said analysis at least two ports of a digital transmission network, said analyzer including:

a clock having an output and constituting a part of said analyzer;

a counter, the output of which is used to time stamp data packets received by said analyzer, the input of the counter being interconnectable with the output of the clock of said other analyzer;

the output of said clock being interconnectable with the input of the counter of said analyzer and to the input of the counter of said other analyzer;

a clock control circuit for selectively interconnecting the clock of said analyzer to the counter of said analyzer and to the counter of said other analyzer, and for disconnecting the clock of said analyzer from the counter of said analyzer in response to a clock-disable signal received by said analyzer from a source external to said analyzer, thereby allowing the clock output of said other analyzer to substitute for the output of the disconnected clock of said analyzer;

at least one receive-transmit circuit, having a receive mode and a transmit mode, for intercommunicating, separately from said digital transmission network, in either direction with said other analyzer; and a receive-transmit control circuit for controlling the transmission and reception capability of the receive-transmit circuit in response to a command from a source external to said analyzer.

2. An analyzer as set forth in claim 1 further comprising an analysis-control computer (40) for sending control signals to operate the clock control circuit (60, 54, 52C) and for sending commands to operate the receive-transmit control circuit (92).

3. An analyzer according to claim 1 wherein said clock control circuit is also capable of sending to another network analyzer a clock-disable signal whereby the clock output substitutes for the clock output of said other analyzer.

4. An analyzer according to claim 3 wherein said received clock-disable signal is received from said other analyzer.

5. An analyzer according to claim 1 wherein said receive-transmit circuit is a half-duplex circuit and said receive-transmit control circuit determines, in response to said command, whether the receive-transmit circuit is in the receive mode or in the transit mode.

6. An analyzer for digital transmission networks with multiple ports, said analyzer having data packet analyzing capability for analyzing digital transmission at one port of a digital transmission network, a facility for participating in an analysis, with at least one other, similar, analyzer analyzing the same digital transmission at another port of said digital transmission network, with intercommunication with said other analyzer, said analyzer including:

at least one receive-transmit circuit, having a receive mode and a transmit mode, for intercommunicating, with said other analyzer analyzing the same digital transmission at said other port; and a receive-transmit control circuit for controlling the transmission and reception capability of the receive-transmit circuit in response to a command from a source external to said analyzer.

7. An analyzer according to claim 6 wherein said receive-transmit circuit is a half-duplex circuit and said receive-transmit control circuit determines, in response to said command, whether the receive-transmit circuit is in the receive mode or in the transit mode.

8. An analyzer according to claim 6 wherein said receive-transmit circuit is separate from said digital transmission network and is capable of communicating in either direction with said other analyzer.

9. An analyzer for digital transmission networks with multiple ports, said analyzer having data packet analyzing capability, a facility for participating, with at least one other analyzer, in an analysis, with intercommunication with said other analyzer, at multiple ports of a digital transmission network, said analyzer including:

at least one receive-transmit circuit, separate from said digital transmission network, having a receive mode and a transmit mode, for intercommunicating in either direction, with said other analyzer;

a receive-transmit control circuit for controlling the transmission and reception capability of the receive-transmit circuit in response to a command from source external to said analyzer;

a second receive-transmit circuit for intercommunicating, separately from said digital transmission network, in either direction with said other analyzer and alternatively with a third analyzer; and a second receive-transmit control circuit for controlling the transmission and reception capability of the second receive-transmit circuit in response to a command from a source external to said analyzer, whereby simultaneous receiving and transmitting intercommunication is possible between said analyzer and said other analyzer or in a first direction with said other analyzer and in a second direction with said third analyzer.

10. A digital transmission network analyzer system, including a plurality of analyzers, for analyzing a network with multiple ports, the analyzers of said system having data packet analyzing capability, a facility for analyzing a digital transmission network with multiple ports with the analyzer system employing synchronization and intercommunication between the analyzers, comprising:

each analyzer of said analyzer system having a local clock having an output, and each analyzer connected to a different port on the network;

an analysis-control CPU connected to each of the analyzers for controlling the analyzers of said analyzer system and programming the analyzers of said analyzer system to perform an analysis;

the output of the local clock in each of the analyzers being interconnectable with the output of the local clock in each of the other analyzers;

a clock control circuit in each analyzer for:

sending to the other analyzers a clock-disable signal in response to receipt of a command from the CPU to serve as a master and to provide clock signals for all of the analyzers, whereby the clock output of the analyzer serving as the master is substituted for the clock output of each of the other analyzers, disabling its own local clock in response to receipt of a clock-disable signal from an other analyzer, thereby allowing the clock output of said other analyzer to substitute for the output of its own disabled local clock;

at least one receive-transmit circuit for intercommunicating in either direction with the other analyzers; and a receive-transmit control circuit for controlling the transmission and reception capability of the receive-transmit circuit in response to a command from the CPU.

11. A digital transmission network analyzer system according to claim 10 wherein the clock-disable signal is received from said other analyzer.

* * * * *